Figure 3:
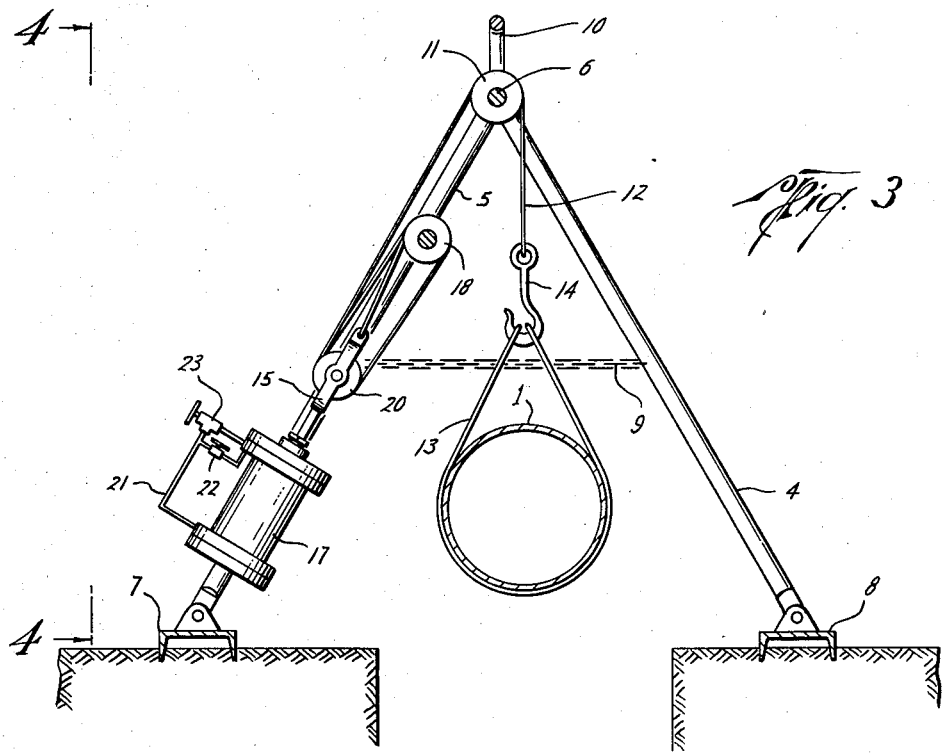

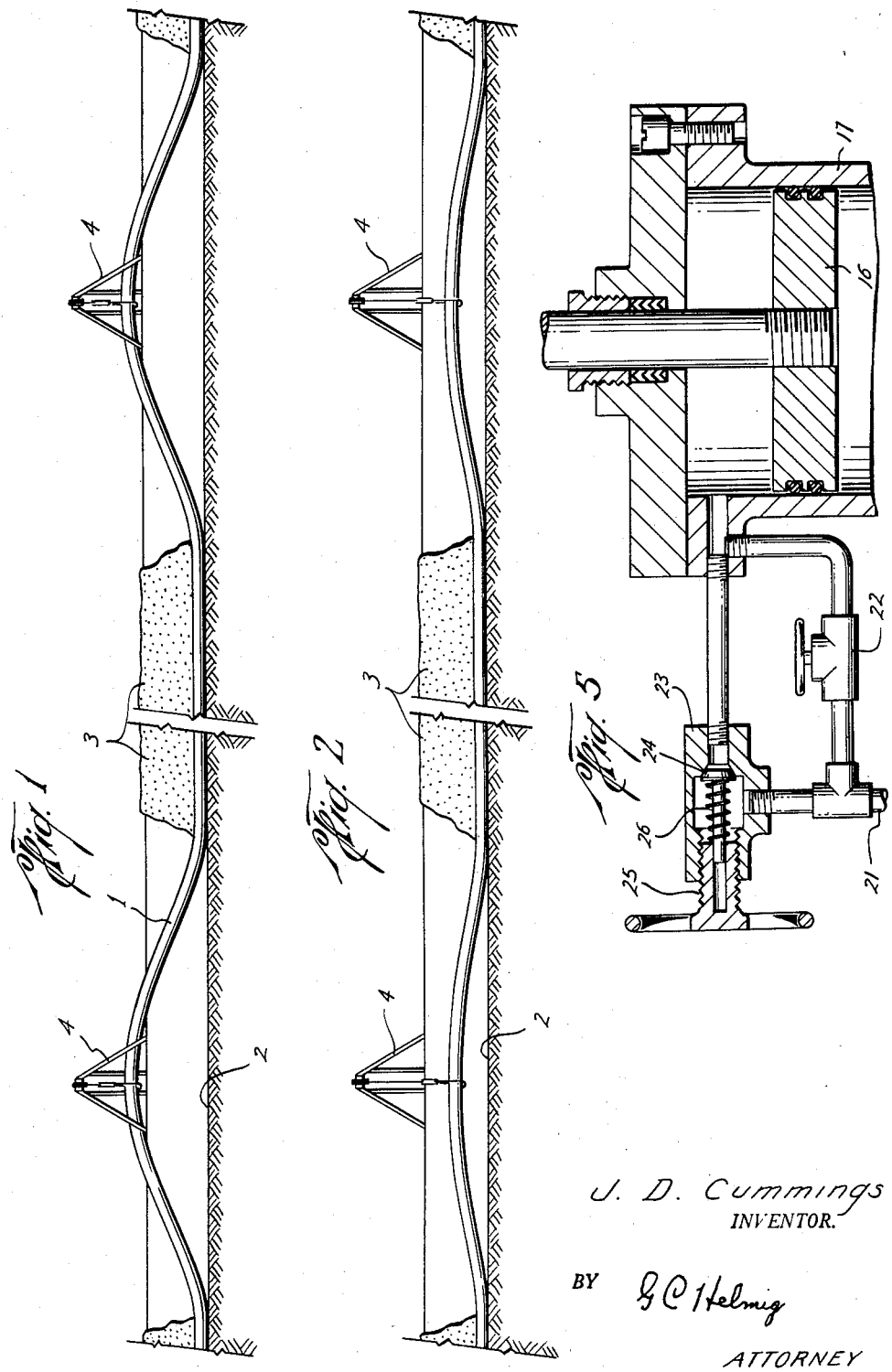

Nov. 11, 1958   J. D. CUMMINGS   2,859,717
SLACK PIPE LOOP LOWERING DEVICE AND METHOD
Filed July 2, 1956   2 Sheets-Sheet 2

J. D. Cummings
INVENTOR.

BY   G C Helmig
ATTORNEY.

United States Patent Office 2,859,717
Patented Nov. 11, 1958

2,859,717

SLACK PIPE LOOP LOWERING DEVICE AND METHOD

James D. Cummings, Houston, Tex., assignor of one-half to Aubrey S. Crutcher, Houston, Tex.

Application July 2, 1956, Serial No. 595,216

2 Claims. (Cl. 111—5)

This invention relates to the installation of cross-country pipe lines, often employed for the flow transmission of liquids and gases. The burial depth of such conduits is such that the surrounding earth remains at substantially uniform temperature and the underground pipe is free of appreciable linear expansion and contraction sufficient to impose harmful compression and tension on the tube walls. Problems of temperature and length changes arise during and until completion of installation operations, and this is especially the case with pipe laying operations utilizing constantly advancing equipment for continuously lowering the pipe to the bottom of a precut ditch at a rapid rate along a long length of pipe previously assembled by welding sections in end to end succession and which lowering operation is followed up by covering the pipe with the trench backfilling operation. In the event steel pipe is lowered while at a high temperature, it later cools off to the temperature of the surrounding earth and contracts in length at a rate slower than the rate at which the operation of installation is proceeding, and such contraction places high tension stress in the pipe wall throughout the length of the line and to an extent which can exceed or approach the tensile limit of the material constituting the pipe wall.

To avoid contraction strain on the pipe wall and insure proper life without costly replacement from fatigue breakage, it is here proposed to install subterranean pipe lines in the customary fashion except for the temporary retention above the trench bottom at longitudinally spaced intervals of uncoveerd slack loop portions of the pipe whose arcuate length in each instance exceeds its straightened out length by an amount which approximates that required to compensate, in co-operation with other similar slack loops, for substantially the contraction in length in the over-all installation, and more particularly to provide loop suspending mechanism arranged to pay out or accommodate a gradual settling of the looped portion toward the trench bottom in response automatically to the contraction pull force set up as pipe wall temperature drops and reaches that of the surrounding earth. After that occurs, the remaining short section of the trench can be backfilled with assurance that the pipe line is properly laid without wall deformation and stretch forces.

The conditions most likely to call for inclusion of a slack between succeeding lengths of deposited pipe line arise, for example, when pipe line is being laid in regions where there is wide variation between day and night temperatures and the pipe being laid throughout the day had previously been exposed to the hot sun or otherwise caused to store up heat which is then given up during the following cooler night, whereupon the shrinkage pull tends to straighten the slack loop and cause it slowly to lower itself in readiness to be overlaid with backfill the next morning. The same situation is presented when pipe wall temperature is increased incident to the protective sheathing thereof in a coating layer of hot tar applied immediately preceding or as a part of the operation by which continuous pipe is payed out to its position of rest on the trench floor.

Among other things, the invention aims to provide an improved slack loop suspension and lowering guide structure which is portable and can be quickly set up in straddling relation to the trench and that portion of the pipe remaining unburied and at the top of the trench and constituting a slack loop in the space between succeeding lengths of buried pipe line projected in both directions from the upwardly extending loop and which guide structure embodies a motion transmitting connection between the elevated loop apex and a load carrying mechanism capable of bearing the normal weight of the loop but yieldable to abnormal load or contraction pull of the cooling pipe line for permitting the gradual lowering of the loop as it straightens out in compensation for pipe length shrinkage resulting from heat dissipation from the pipe wall.

Figure 4:
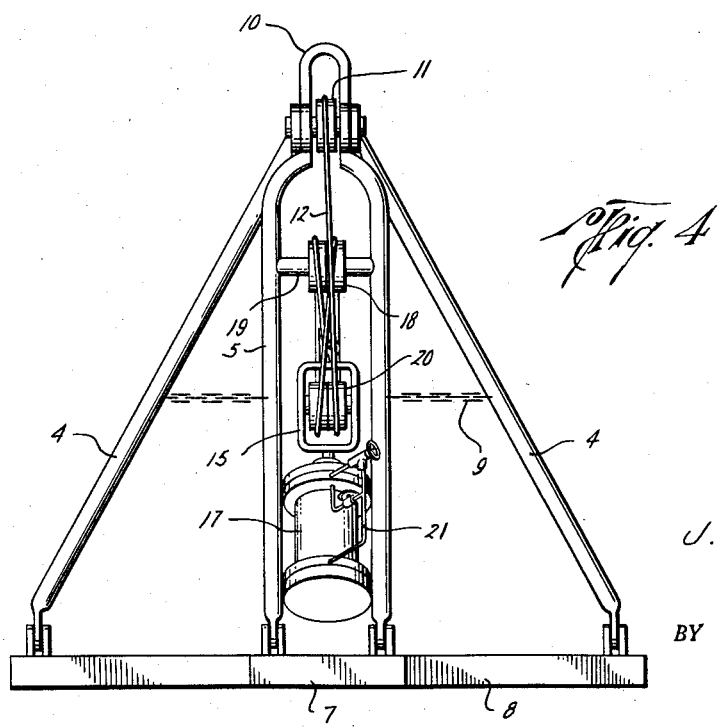

A preferred but not necessarily the only embodiment of the invention is illustrated in the accompanying drawing wherein Figure 1 shows a short fragment of a pipe line partially installed in a trench with the trench being shown in vertical section longitudinally of the pipe; Fig. 2 is a view similar to Fig. 1 but indicating a partial straightenening out of the slack loop as it moves toward the bottom of the trench; Fig. 3 is an end view with parts in section of a loop lowering mechanism in bridging relation to the trench; Fig. 4 is a side elevation of the lowering mechanism as on line 4—4 of Fig. 3; and Fig. 5 is a detail vertical sectional view of a hydraulic control for yieldably supporting the slack loop load.

In preparation for laying a pipe line, an open trench is excavated and the dirt removed is laid to one side. Sections of pipe of convenient length on the order of about thirty feet are brought alongside and are welded in end to end succession to form a continuous line, and after being coated with a corrosion resistant layer the pipe is transferred to the bottom of the trench by tractor mounted traveling cranes. In some instances the coating mechanism is supported for movement along the pipe and the coated pipe is directly payed out into the open trench. Backfilling machines then return the previously excavated dirt. For taking care of the subsequent contraction of the pipe, it is here contemplated that at spaced intervals the deposit of short lengths of pipe will be interrupted, so that elevated loops will occur at predetermined distances apart. The lengths of the looped portions may be on the order of from fifty to two hundred feet, at distances apart of one-half to one mile or thereabouts, depending on pipe size and operating temperatures, but such distance may vary for particular installations and are mentioned merely by way of examples of practical experience. Calculations beforehand will be made to determine in any instance what loop excess length is required in relation to contraction allowances necessary and the frictional resistance to length creepage of buried pipe.

Figures 1 and 2 show portions of a continuous line of pipe 1 of which alternate long and short sections, respectively, rest on and are suspended above the bottom 2 of a trench. The major portion of the pipe line length or that resting on the trench bottom 2 has been overlaid with the backfill earth 3 and each uncovered loop at its uppermost portion is tied to a weight suspending mechanism by which it can be guided downwardly as it tends to straighten out in response to tension forces in the pipe line. Figure 1 illustrates the relation of the parts initially, and Fig. 2 illustrates the same parts with the slack loops partially moved toward the trench bottom and which action occurs automatically as the heat in the pipe wall is slowly diminished and the pipe line gradually contracts linearly.

As a compact and sturdy loop suspending mechanism which can be quickly set up and later folded and carried to a new point of use, there is shown in Figs. 3 and 4 a trench bridging tripodlike frame. The frame includes two sets of legs 4 and 5 which at their upper ends are pivotally connected on a hinge pin 6 and diverge downwardly and outwardly to rest on the ground on opposite sides of the trench. For good anchorage bearing, the leg 5 is hinged at its lower end to a channel-shaped foot 7, and a similar or longer channel-shaped foot 8 is hingedly connected to the lower ends of the set of legs 4. As best seen in Fig. 4, the legs 5 consist of a pair of relatively closely spaced parallel posts, while the set of legs 4 comprise two posts which diverge downwardly to a widely spread apart relation at their lower ends, so that the two sets of legs co-operate in providing a stable tripod frame. Tie chains 9 extend between the two sets of legs as a safety limit against the legs spreading too far apart about their pivot axis under load. When not in use, the two sets of legs can be folded together into a compact package. Extending upwardly above the upper ends of the legs and connected to the hinge pin 6 is a lifting clevis 10 for connection with a hoist chain in the placement and removal of the frame.

Loosely mounted on the hinge pin 6 is a fixed sheave 11 around which is passed a motion transmitting cable 12 having one end depending or hanging downwardly from the sheave 11 in vertical alignment with the slack loop pipe line portion to be suspended and being suitably fastened to the pipe line as by means of a hanger strap 13 in which the pipe is saddled and whose opposite ends are detachably received by a hook 14 forming the one terminal of the flexible cable 12.

At its opposite end the cable 12 is fastened to a frame 15 carried by a movable piston rod forming a part of a hydraulic piston and cylinder assembly which includes, as seen in Fig. 5, a slidable piston or movable wall 16 and a cylinder 17. The cylinder housing 17 is welded or otherwise rigidly mounted to both of the frame legs comprising the posts 5, and within the space between these posts, and is preferably disposed with its axis substantially parallel with the longitudinal extent of the supporting posts 5. The direction of piston movement is toward and away from the sheave 11, and preferably its range of movement is much smaller than the distance between the top and the bottom of the trench and consequently a simple motion multiplying arrangement is provided in the form of a block and tackle for the lowering cable 12. Thus an intermediate portion of the cable 12 is entrained and looped several times about a fixed pulley 18 pivotally mounted on a crossarm 19 between the supporting legs 5 and on a traveling pulley 20 pivoted in the piston connecting rod frame 15.

The movable wall or piston 16 partitions the cylinder 17 into two variable volume chambers on opposite sides of the piston, and these chambers are connected with one another through a connecting pipe 21 for the flow of the hydraulic fluid from one side to the other of the piston. At its upper end the connecting passage 21 has two branches leading into and from the load carrying chamber side of the piston 16. One of these branches contains a normally closed hand-operated valve 22 which can be opened for the free passage of fluid from the underside to the upper side of the piston when the hydraulic motor is first set up for each loop lowering operation. The other branch contains a normally closed valve which opens in response to a predetermined pressure for bleeding off liquid from the top of the cylinder when under a pressure load in excess of a given value. This valve assembly includes a housing 23 and an outwardly opening poppet valve 24 having a guide stem received within an adjustable plug 25 screwed into the low pressure side of the valve housing 23 and forming bearing for one end of a coil spring 26 surrounding the valve stem and having its opposite end engaged with the valve head 24 to maintain the valve in closed or seated position. Adjustment of the screw plug 25 enables variation of spring compression to control the yielding opposition of the regulator valve 24 in relation to the load of the slack loop portion which is to be supported. This setting will ordinarily be such that the gravity load being suspended will approximate or be slightly less than the hydraulic pressure above the piston and necessary to crack the valve 24. For some installations this relation can be varied so that only a part of the arched pipe load is suspended with the wall of the vertical loop between the grounded ends under some axial compression, but in any event, the arcuate pipe bow will be held in an upright position and guided downwardly as line tension forces tend to pull down and straighten out the loop and are transmitted through the cable 12 to the liquid trapped above the piston and then displaced or relieved by bleed-off past the control valve 24 for flow to the cylinder chamber below the upwardly traveling piston.

Thus the loop will be suspended yieldably and its movement downwardly resisted by a substantially constant opposing tension force to be overcome by a pipe contraction increment. That is, the load carrying mechanism and in particular the liquid flow spring seated regulator valve will yield automatically and pay out the cable for lowering the pipe loop toward the trench bottom during the cooling off period in which the pipe contracts in length. With length contraction, the tension force causes a sliding creepage of the pipe under the fill in both directions away from the loop, slowly pulling down or decreasing the size of the loop and using up the slack in compensation for shortening with heat reduction. By this arrangement no unusual strains are imposed on or remain in the pipe as might deform the wall or maintain it under excessive tension, and there is no likelihood of lifting through the overburden in response to pipe length shortening, of those portions of the buried pipe immediately beyond the unfilled part of the trench and displacement of dirt below the elevated pipe to interfere with final pipe placement at the prescribed depth. The lowering operation is entirely self regulated and requires no manual attention after the parts are once set up and adjusted. The work of installing a pipe line can proceed throughout daylight hours, and the self lowering or straightening out of the spaced apart slack loops can occur during nighttime. On the following morning the suspension mechanism can be uncoupled and carried forward for the day's use and the backfilling operations completed at each trench interval which had been left open at slack loop positions.

While the foregoing description is limited to but one embodiment of the invention, it is to be understood that modifications can be made as come within the scope of the appended claims.

What is claimed is:

1. The method of installing a buried pipe line, comprising excavating a trench, depositing longitudinally spaced apart relatively long continuous lengths of pipe on the trench bottom with an upwardly arched relatively short connecting length of pipe rising above the trench bottom under initial linear compression between the trench bottomed opposite ends thereof, backfilling the trench over the trench bottomed relatively long lengths of pipe and fastening the arched length of pipe against turning about the longitudinal axis of the trench by connecting the arched length to a variable volume pressure fluid device, setting a pressure responsive valve to relieve fluid pressure within the device in excess of a predetermined constant level for offering resistance to load thereon below a given value and yielding to load above said given value for maintaining substantially constant tension on the arched length of pipe sufficient to maintain the same upright as it is pulled toward the trench bottom under temperature change contraction throughout the pipe line length and finally removing the fastening of said device to the short pipe length after its arch has flattened in compensation for pipe length contraction and thereafter backfilling the remainder of the trench.

2. In combination with a pipe line trench and a continuous pipe line having longitudinally spaced apart relatively long portions rested within the trench and connected by a relatively short slack loop portion rising vertically upwardly above the trench bottom and being initially under longitudinal compressive loading throughout its length, of lowering mechanism holding the upper end of the slack loop portion in an upright plane clear of the trench side walls and comprising piston and cylinder members affording a variable capacity pressure chamber therebetween, an overhead suspension frame overlying said slack loop portion and having one of said members secured to the frame, a load transmitting cable connecting the other member to the upper portion of said slack loop portion, a fluid confined within said variable volume chamber and resistant to relative movement of said members under the cable transmitted load of said slack loop portion, and a chamber pressure relief valve responsive to chamber fluid pressure of a given value as predetermined in relation to cable transmitted load in excess of a loading sufficient to suspend the slack loop portion against side tilt and which excess results from decrease in the initial longitudinal compression loading of the slack loop portion with temperature drop linear contraction of the pipe line.

References Cited in the file of this patent

UNITED STATES PATENTS

| 101,681 | Towle | Apr. 5, 1870 |
| 181,761 | Borger | Aug. 29, 1876 |
| 510,697 | Mesta | Dec. 12, 1893 |
| 700,162 | Wiley | May 13, 1902 |
| 1,067,444 | Scott | July 15, 1913 |
| 1,497,091 | Dahill | June 10, 1924 |
| 1,551,132 | Butler | Aug. 25, 1925 |
| 1,792,855 | McRae | Feb. 17, 1931 |
| 2,333,208 | Spear | Nov. 2, 1943 |
| 2,476,953 | Bennett | July 26, 1949 |